Patented May 1, 1928.

1,668,475

UNITED STATES PATENT OFFICE.

WILLIAM BURTON WESCOTT, OF QUINCY, MASSACHUSETTS, ASSIGNOR TO THE RUBBER LATEX RESEARCH CORPORATION, OF BOSTON, MASSACHUSETTS, A CORPORATION OF MASSACHUSETTS.

REENFORCED ABRASIVE ARTICLE AND PROCESS OF MAKING THE SAME.

No Drawing.   Application filed November 18, 1922. Serial No. 601,910.

This invention relates to reenforced abrasive articles and processes of making the same; and it comprises an abrasive article bonded by ebonite or hard rubber and strengthened or reenforced by contained long vegetable or mineral fiber, such fiber being usually cotton; and it further comprises a method of producing such a reenforced hard rubber bonded abrasive article wherein an abrasive material is admixed with relatively long fibers, the mass moistened with a solution of latex, dried, shaped and vulcanized; all as more fully hereinafter set forth and as claimed.

I have found that by the use of rubber latex, hard rubber can be produced reenforced by relatively long fibers, giving material of unusual strength and of other desirable properties. The reenforced hard rubber may be used as a bond for various granular materials and particularly abrasive materials in making abrasive articles. Or the reenforced hard rubber, containing the usual fillers, may be used as such for the various purposes for which hard rubber is adapted. Reenforced hard rubber, as such, and the process of making the same, however, I do not herein claim, this forming the matter of my copending application Serial No. 156,764, filed December 23, 1926. The present application relates more particularly to abrasive articles.

In the usual compounding of rubber to make such materials as hard rubber, the rubber and the compounding ingredients added thereto are milled together. Where the filler is finely divided, as in the case of whiting, zinc oxid, etc., the milling accomplishes the desired result; but the situation is different when compounding ingredients of a coarser nature are to be used, as in the making of abrasive articles. In particular the exigencies of milling preclude the use of fiber of effective length as a reenforcing and strengthening ingredient. Fiber is extremely desirable in such compositions for reenforcing and toughening; but milling breaks up and disintegrates it. Any fiber added to the composition and milled therewith is disintegrated and reduced to extremely short lengths. It is one object of this invention to produce hard rubber articles containing distributed fibers of substantial length and random arrangement in a simple and ready manner, with economies in the use of material and safety in operation.

In making my composition I take advantage of the properties of latex or rubber emulsions containing the caoutchouc of latex. Latex is the milky sap of various plants and can be obtained carrying as high as 20 to 30 per cent of caoutchouc. Whether this caoutchouc as it is contained in the latex emulsion is the same chemically as the ordinary caoutchouc of raw rubber is an undecided question. For the present purposes it is convenient to call it by that name. Latex readily coagulates or clots, with production of ordinary raw rubber as a reticulated or veined coagulum; the coagulum not being homogeneous. Acids, creosote and various other chemicals produce coagulation; and coagulation even takes place on mechanical agitation. Latex can however be shielded against coagulation by the presence of various stabilizing chemicals, mostly of an alkaline nature. Ammonia is the most convenient stabilizer. Various purified and concentrated standardized preparations having the properties of rubber emulsions or caoutchouc emulsions may be made from latex by the expedient of segregating more concentrated emulsions from latex in a centrifugal separator, wherein the segregated portions may be washed, treated with alkaline solutions, etc., as more fully described and claimed in my copending application, Serial No. 601,909, filed November 18, 1922. In the present invention I may use either the ordinary latex, stabilized with a little alkali, or the stated purer standardized preparations made therefrom.

On drying down, latex at first gives a gel, this gel formation being "irreversible" and then a film or body of strong, resilient and tough caoutchouc; this dried gel, unlike the rubber produced in coagulation, being substantially homogeneous physically. The caoutchouc of the dried gel also differs materially from coagulation rubber in other respects, notably in its reactions with sulfur. In vulcanization it behaves more like long milled rubber than like raw rubber.

In the present invention as directed to the manufacture of abrasive articles, in lieu of milling or grinding together the materials which are to be compounded, I simply mix them and incorporate sufficient latex or latex preparations to act as a bonding agent, dry, shape and vulcanize. On drying, the latex yields intergranular films of dried gel bonding together and uniting the several ingredients. As will be observed, in operating in this way it is possible to incorporate any desired amount of any desired fiber; no milling or long-continued mechanical working being necessary.

Operating in this way, I am also enabled to use various waste rubber materials as substantial components such as hard rubber waste, rubber buffings, etc. with substantial economies in operation. On vulcanization these materials, together with the latex caoutchouc, are converted into an integral mass of hard rubber.

In making my mix, no difficulty arises in the incorporation of fiber in any amount and of any character. Admixture may be dry or wet. In the latter event I use latex or a dilution thereof. Because of the penetrating nature of latex it is practicable to apply the undiluted latex directly to a wet pulp or body of the other ingredients. I rarely use more latex than would correspond to about 5 per cent latex caoutchouc in the final article. The mixture is ordinarily dried to convert the latex solids into gel, is then further subjected to drying under, advantageously, reduced pressure, molded, pressed and cured. As latex is a liquid which freely permeates fiber and fiber bundles, passing into even capillary pores, the unitary hard rubber of the bond permeates the fiber in so far as this fiber is open or porous in texture.

In the present invention I have devised a method of producing articles bonded with hard rubber in which the physical characteristics of the coarse compounded ingredients are not injured as is the case in the ordinary milling treatments. It lessens the tendency of the rubber bond to shatter, crack, pit and fissure under bending strains.

In the manufacture of rubber bonded abrasives the grains of abrasives are usually milled with and into the rubber. This is not only hard on the milling rolls but also tends to shatter, disintegrate and dull or round the abrasive grains themselves. In milling the grains abrade each other, dulling and rounding their cutting or abrasive edges and angles and produce fines which form part of the final composition. In an abrasive wheel so made there is always fine abrasive even where only definite sized grains were used in the mixture. The presence of this fine abrasive is deleterious to the clean cutting action and causes undue heating. But by simply mixing the abrasive grains with the other components of the final article in the manner stated and bonding with latex caoutchouc no injury of the abrasive grains occurs, and the finished product contains the chosen size grains only and is in consequence uniform in its action and relatively free cutting. In making such articles I customarily use fiber in the rubber mixture. In abrasive wheels and similar articles the added toughness and strength given by fiber in the hard rubber are particularly advantageous. As the abrasive material I may use any of the ordinary abrasive materials, such as carborundum, alundum, siloxicon, corundum, silica, natural emery, garnet, etc.

In making abrasive articles having the fiber reenforced hard rubber bond, I may use various amounts of fiber. Ordinary cotton fiber may be employed, or disintegrated, rubber frictioned cotton fiber and thread as produced in the usual processes of reclaiming rubber from old tires and the like may be used. It carries some rubber with the fiber and this rubber, although not permeating the fiber as does latex, adds to the intergranular rubber and is useful. Instead of cotton, jute, linen, wool, etc., or even asbestos fiber, may be employed. Asbestos-reenforced articles, are not herein specifically claimed, such materials forming a basis for claims in my copending application, Ser. No. 160,532, filed January 11, 1927. In making an abrasive article, the desired amount and character of abrasive material, carborundum, for example, is stirred together with the other materials, making a uniform mixture. This mixture is then moistened with latex. About 5 per cent of latex rubber will usually suffice for bonding. Instead of mixing dry and then putting in the latex, the latex or latex solution may be used directly in making the mixture. The water is dried out to convert the latex into a dry gel and the composition heated and compacted, heating being under vulcanizing conditions appropriate for converting all the rubbery materials into hard rubber.

In an abrasive wheel, the hard rubber, reenforced with the fiber, gives a tough, hard article in which the abrasive is firmly held. The additional tensile strength given by the incorporated fiber is particularly advantageous with abrasive wheels, adding much to their power of resisting cracking, splitting and disintegration. In its presence there is an increased resistance to breaking and cracking under bending stresses. Hard rubber does not shatter or break readily. In making these wheels it is a desirable expedient to use two sizes of grain, as this reduces the "void space" and gives a certain amount of mechanical interlocking between the grains which is desirable for strength and gives an added resistance against pulling out the grains in use. But in so doing, the hard rubber bonding agent is necessarily reduced to thin layers or even films; and it is in such thin layers or films that the added strength given by the fiber is particularly advantageous. In wheels made under the present invention the original grain size and shape and sharp cutting edges are retained; there being no necessity for any working which would injure either. While I have spoken more particularly of abrasive wheels it is, of course, obvious that other abrasive articles can be made in the manner stated.

What I claim is:—

1. In the manufacture of articles composed of or comprising hard rubber, the process which comprises admixing comminuted old rubber, abrasive materials, sulfur and latex solution, drying, molding and vulcanizing.

2. In the manufacture of articles composed of or comprising hard rubber, the process which comprises admixing finely comminuted old rubber material, sulfur, fiber, abrasive material and latex solution, drying, molding and vulcanizing.

3. An abrasive article comprising a body of hard rubber containing distributed reenforcing, relatively long fiber permeated by said rubber, said body containing grains of abrasive material therein, such grains being of two different predetermined sizes to establish a low void ratio and such grains having their normal sharp-edged shape and their normal grain size.

4. The method of making abrasive articles, comprising mixing abrasive particles with latex, and thereafter converting the latex into a rubber bond, substantially as described.

5. The method of making abrasive articles, comprising mixing abrasive particles with latex and a vulcanizing agent, forming the articles of the mixture, and vulcanizing them, substantially as described.

6. An abrasive article comprising abrasive particles and a binder formed in situ from latex, substantially as described.

7. An abrasive article comprising abrasive particles and a vulcanized rubber binder formed in situ from latex, substantially as described.

8. The method of making abrasive articles, comprising mixing abrasive particles with latex, shaping the articles from such mixture, and converting the latex into a rubber bond, substantially as described.

9. The method of making abrasive articles, comprising mixing abrasive particles with latex, forming the mixture into particles, and vulcanizing the articles, substantially as described.

10. The method of making abrasive articles, comprising mixing abrasive particles with latex, separating the rubber of the latex from the water, and thereafter forming the articles and converting the rubber into a bond, substantially as described.

11. That step in the method of making abrasive articles, which consists in mixing abrasive particles with latex, substantially as described.

12. An abrasive article comprising a body of hard rubber containing grains of abrasive material therein, such grains having their normal sharp-edged shape and their normal grain size, said article also containing distributed relatively long cotton fiber in random arrangement throughout said hard rubber, and the bonding rubber being derived from latex gelled in situ, said rubber constituting about 10 per cent of the whole article.

In testimony whereof, I have hereunto affixed my signature.

WILLIAM BURTON WESCOTT.